United States Patent [19]
Kawaguchi et al.

[11] 3,917,892
[45] Nov. 4, 1975

[54] SOLDERABLE AND THERMOSTABLE INSULATED WIRES

[75] Inventors: Munetaka Kawaguchi; Hirohiko Nakabayashi, both of Osaka, Japan

[73] Assignee: Sumitomo Electric Industries, Ltd., Osaka, Japan

[22] Filed: Jan. 2, 1974

[21] Appl. No.: 430,128

[30] Foreign Application Priority Data
Dec. 29, 1972 Japan.................................. 47-2321

[52] U.S. Cl. .............. 428/383; 260/75 N; 427/117; 427/118; 428/379
[51] Int. Cl.²..................... H01B 3/30; C08G 73/10
[58] Field of Search..... 117/232, 218, 128.4, 161 K, 117/161 P; 427/117, 118; 428/379, 383; 260/75 N

[56] References Cited
UNITED STATES PATENTS

| | | |
|---|---|---|
| 3,300,843 | 1/1967 | Umewaka et al. ............... 117/218 X |
| 3,306,771 | 2/1967 | Schmidt et al. .................... 117/218 |
| 3,446,660 | 5/1969 | Pendleton ....................... 117/232 X |
| 3,458,480 | 7/1969 | Schmidt et al. ................. 117/232 X |
| 3,475,212 | 10/1969 | Bach .............................. 117/232 X |
| 3,516,858 | 6/1970 | Fitzhugh et al. .................... 117/218 |
| 3,707,403 | 12/1972 | Dobbelstein et al. ............... 117/218 |
| 3,732,168 | 5/1973 | Ottmann et al. ................. 117/232 X |
| 3,793,250 | 2/1974 | Schmidt et al. .................. 117/232 X |
| 3,822,147 | 7/1974 | Koerner et al. ..................... 117/232 |

*Primary Examiner*—Ralph Husack
*Attorney, Agent, or Firm*—Sughrue, Rothwell, Mion, Zinn & Macpeak

[57] ABSTRACT

A solderable thermostable insulated wire comprising a conductor having a wire enamel coated and baked thereon, the wire enamel comprising mainly the reaction product of (A) a dicarboxylic acid free of a 5-membered imide ring and/or a derivative thereof, (B) a dicarboxylic acid containing a 5-membered imide ring and/or a derivative thereof, (C) a trihydric or higher aliphatic polyhydric alcohol, and (D) a dihydric alcohol, the equivalent proportions of the the components (A), (B) and (C) being 10 to 40 equivalent % for the component (A), 20 to 50 equivalent % for the component (B), and 40 to 55 equivalent % for the component (C).

21 Claims, 2 Drawing Figures

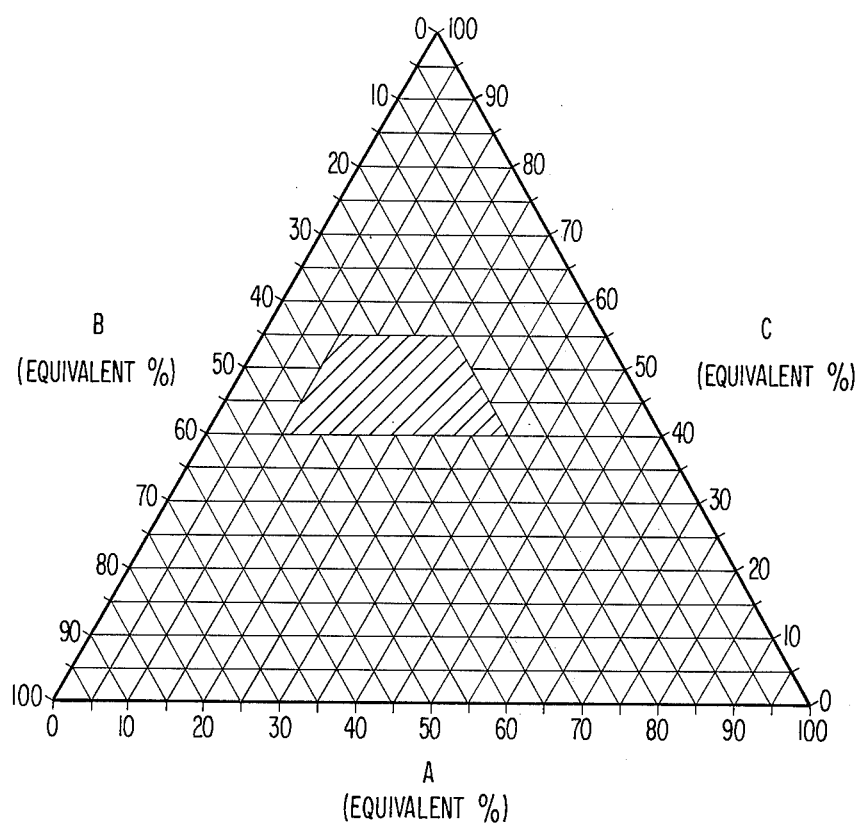

SOLDERABLE AND THERMOSTABLE INSULATED WIRES

BACKGROUND OF THE INVENTION

1. Field of the Invention

This invention relates to solderable and thermostable insulated wires.

2. Description of the Prior Art

In recent years, there has been a growing tendency for electrical machines, such as motors or transformers, to be constructed in smaller sizes and lighter weights, and it is desired to increase the reliability of the machines. Accordingly, thinner and higher performance insulated wires or magnet wires used in these electric machines have been desired. In order for the electric machines to be smaller in size, it is necessary to attenuate the insulated wires. It is not sufficient, however, to use the same insulating materials as in the prior art because, even when the machinery is reduced in size, the same performance as, or a greater performance than, the conventional machinery is required, and a higher load is exerted on the attenuated insulated wires. Naturally, the insulating material must have a higher performance. With such a background, highly thermostable materials have been developed for use in producing thermostable insulated wires. Moreover, for use under severe conditions, an increase in the reliability of insulated wires is desired, and development of materials having superior chemical resistance, e.g., resistance to alkali, resistance to solvents, or resistance to hydrolysis, is under way. It is noted that of the thermostable insulating materials now available, those having good thermal stability have good chemical resistance.

On the other hand, electrical machinery manufacturers have pushed forward automation and production on an assembly line in order to minimize the cost of production. One such attempt is the removal of insulation on an assembly line. Magnet wires are wound on a motor, transformer, etc. At this time, the insulation coating at the coil ends or lead wires must be removed for soldering. Methods for removal of insulation include (1) mechanical removal (the insulation is cut off mechanically using, for example, a wire brush or a knife), (2) removal by heat decomposition (the insulation is decomposed at high temperatures using a flame, for example), (3) chemical removal (the insulation is decomposed with a chemical such as an alkali), and (4) removal by solder (the insulation is decomposed in a molten solder bath). All of these methods have their own advantages and disadvantages. According to method (1), large quantities of insulation cannot be removed at one time, and also the conductors tend to be damaged. Thus, in the case of thin wires, breakage frequently occurs rendering them unsuitable for use, and this method does not comply with the trend toward attenuation of wires. According to method (2), that part of the insulating material which is near the coil end to be removed tends to be decomposed as well, because of the heat applied. Particularly in the case of thin wires, not only the insulating material but also the conductor is melted resulting in a breakage of the wires or a decrease in the conductor diameter. Thus, this method is not feasible for practical applications, and does not comply with the trend toward attenuation. Method (3) makes it possible to remove a large number of insulations at one time, but, since a certain period of time is required, a problem arises in continuous operation. Moreover, this method is more time-consuming for insulations having good chemical resistance. Method (4) enables a large number of insulations to be removed within a short period of time, and no problem arises even when the removal is conducted on a continuous assembly line. Furthermore, since solder is adhered to the conductors after removal of the insulation, the conductors are easily solderable. When it is desired to solder insulated wires to each other, this method can be advantageously used since by twisting insulated wires having coatings of wire enamel and dipping a strand of the wires, the removal of the insulation and soldering are performed at a time. The removal of the insulation can be simply and precisely performed even with thin wires. However, when the coatings of wire enamel are not decomposable with molten solder, this method is useless.

Of these methods for insulation removal, method (3) (chemical removal) and method (4) (removal with solder) have process advantages in that they permit the processing of a large number of wires at one time and can be automated and performed on an assembly line. Method (4) is considered the most useful because solder adheres to the conductors at the time of the removal of the insulation, and the removal of the insulation and the soldering of the wires can be accomplished at one time. This capability of being removed by solder is called solderability, and is one of the characteristics which electrical machinery manufacturers strongly desire.

As has been stated hereinabove, insulated wires desirably should be not only attenuated and improved in thermal resistance and chemical resistance, but also be processable on an assembly line for the removal of the insulation. However, improvement in thermal resistance and chemical resistance is quite inconsistent with the removability of the insulation on an assembly line. Methods for attaining removability of insulation on an assembly line are method (3) (chemical removal) and method (4) (removal by solder). However, the higher the chemical resistance of the insulation increases, the more stable is the insulation to chemicals, making it difficult to remove the insulation with chemicals. Further, when wires are made thermally resistant, the insulation becomes thermally stable, and cannot be completely decomposed in molten solder, but remain carbonized, in which case the soldering of the wires becomes difficult. With solderable wires, the insulation usually is easily decomposed and separated when the molten solder is at a temperature of about 360° to 400°C., and solder is adhered to the conductors. However, with thermally stable wires, the insulation is not completely decomposed even when the temperature of the molten solder is increased to a temperature as high as 500°C., with the result that the insulation is carbonized and covers the conductors. To decompose the insulation by increasing further the temperature of the molten solder would not only dangerous, but also cause the copper of the conductors to diffuse into the solder and thus to make the conductors thinner. Consequently, the soldered joint parts of the conductors tend to break, and with thin wires, the conductors would be lost. Accordingly, the temperature of the molten solder can usually be increased to about 450°C. at most.

The time during which the insulated wires are dipped in a molten solder bath is preferably as short as possible. Usually, when the conductor diameter is 1 mm, the time is desirably within 5 seconds, and at the longest about 10 seconds. If, for example, the time takes as long as 60 seconds, this not only becomes a problem on a continuous assembly line, but also the heat transmitted through the conductors adversely affects those portions of the insulation which are near the insulation in the solder bath. Moreover, the copper of the conductors in the solder bath gradually diffuses into the solder resulting in thinner breakable conductors. Thus, the desirable soldering conditions are that the soldering be performed at a solder temperature of not more than 450°C. for a time of not more than about 10 seconds. Under these conditions, thermally stable materials now available would not be solderable.

Such being the case, improvements in thermal resistance and chemical resistance are in direct opposition with the removal of the insulation on an assembly line. Thus, when it is strongly desired to improve the thermal resistance and chemical resistance of insulated wires, the insulation must be removed by a mechanical method or a heat decomposing method, and no attempt to perform this operation on an assembly line would be made. Since mechanical removal of the insulations of thin wires is difficult, it has been necessary to rely on the heat decomposing method in spite of the possible adverse effects on other parts of the wires than the coil ends. Conversely, when it is desired to perform the removal of the insulation on an assembly line, the thermal resistance and chemical resistance of the wires cannot but be sacrificed. In recent years, however, attenuation of wires and cables has been attempted to a greater extent, and because of the demand for automation, there has been a strong desire for thermostable insulated wires having solderability. More recently, as a result of fires in color television sets in U.S.A., fire retardancy of the wires has become increasingly desirable.

Examples of thermostable materials now in widespread use are polyimides, polyamide-imides, and isocyanurated polyesterimides materials. When these materials are used for insulated wires, these materials have superior cut-through resistance and heat resistance as well as good fire retardance and chemical resistance. However, these superior properties make the removal of the insulation even more troublesome and time-consuming. When these materials are dipped in chemicals, they are not decomposed within short periods of time, and when immersed in a solder bath at a temperature as high as 500°C., they are carbonized and adhere to the conductors, making it impossible for the solder to adhere to the conductors. This is clearly demonstrated, for example, by Comparative Examples 5 and 7 hereinafter. Accordingly, the removal of insulation can at present be performed only by mechanical cutting of the insulations or burning them away with a flame, and this presents a great setback against the performance of this operation on an assembly line. In addition, as stated previously, the above methods are substantially useless for treating thin wires, and do not comply with the current trend for attenuating insulated wires. Accordingly, these materials are used mainly for wires of medium to large sizes, and only in applications which require sufficient thermal resistance.

One of the insulating materials which have recently come into widespread use is a thermosetting polyester, but this material has low thermal stability and does not exhibit satisfactory fire retardancy which has been of greater concern lately. An attempt to enhance its thermal properties by increasing the amount of cross-linking would improve the thermal properties that are effective for a short period of time (such as cut-through resistance), but contribute only to a limited improvement in the thermal properties that are effective for a long period of time (such as dielectric breakdown after heat degradation) because of its chemical structure. This material can be decomposed with an alkali, but those thermosetting polyesters which have been improved in thermal stability take a longer time for decomposition. Generally, polyesters have poor solderability, and even when they are immersed in a solder bath for prolonged periods of time, the carbonized insulation freqently remains attached to the conductors. This will be clear from Comparative Example 6 to be given later on. Accordingly, polyesters are not completely satisfactory insulating materials in applications which require both solderability and thermal stability.

Polyurethanes are well known as insulating materials having solderability, and are popular among the electrical machinery manufacturers because they are solderable at a relatively low temperature of 360° to 400°C. and can be easily processed on an assembly line. However, polyurethanes have poor thermal resistance which is classified at best as Class E (a thermal rating according to the criterion given in JIS C-4003 corresponding to IEC Publication 85). Furthermore, since they are combustible, they do not meet the requirements of modern insulating materials. However, polyurethane insulating materials are still popular among manufacturers, because they permit easy insulation removal on an assembly line, and this advantage is especially great with attenuated wires. In other words, polyurethane insulating materials have process advantages and are readily available especially in the case of attenuated wires, and a demand for rendering them thermally stable and fire-retardant has arisen. With other insulating materials, the line of the manufacturing process should be changed. The increase in the number of process steps requires an increase in manpower or equipment. It is for this reason that the change to thermally stable materials has not been made, and even now, polyurethane materials are in widespread use.

Thus, none of the known insulating materials have a combination of solderability, thermal stability and fire retardance, and there has been an increasing demand for these materials in recent years.

Extensive investigations of the present inventors in an attempt to meet this demand have led to the discovery of an insulated wire having solderability, good thermal resistance, and fire retardance.

SUMMARY OF THE INVENTION

According to this invention, there is provided a solderable thermostable insulated wire, comprising a conductor and a wire enamel coated on the conductor and baked thereon, the wire enamel being composed mainly of the reaction product of (A) a dicarboxylic acid free of a 5-membered imide ring or its derivative or a mixture of these, (B) a dicarboxylic acid containing a 5-membered imide ring or its derivative or a mixture of these, (C) an aliphatic polyhydric alcohol which is trihydric or higher, and (D) a dihydric alcohol, the proportions of the components (A), (B) and (C) being 10 to 40 equivalent %, 20 to 50 equivalent %, and 40 to 55 equivalent %, respectively.

BRIEF DESCRIPTION OF THE ACCOMPANYING DRAWING

The FIGURE shows the equivalent proportions of the components (A), (B) and (C), and the hatched portion of the drawing is the range specified and claimed in the present invention.

DETAILED DESCRIPTION OF THE INVENTION

The insulated wire obtained in accordance with this invention has good solderability and superior thermal resistance and fire retardance. The insulated wires of this invention are insulated wires of the polyesterimide type. Polyesterimides are thermally stable materials of Class F, and needless to say, have fire retardance. As previously stated, solderability is a property quite inconsistent with thermal stability, and it has been considered to be impossible to achieve for both of these properties together. Accordingly, it has been thought that a polyesterimide material (Class F) having a higher thermal stability than a thermosetting polyester (Class B) which is virtually unsolderable naturally cannot be soldered. Furthermore, the imparting of solderability to the polyesterimide material was unimaginable.

However, it has been found by the present inventors that good solderability and superior thermal resistance can be achieved together in a polyesterimide (Class F) within a very specific range. Within the specific range set forth in the present invention, not only are good solderability and superior thermal stability and fire retardance obtained, but also flexibility essential to insulated wires and a smooth surface can be attained.

An especially important feature of the present invention is the combination of the equivalent proportions of the components (A), (B) and (C) as shown in the FIGURE. The range claimed in the present invention is shown by the hatching. The aliphatic polyhydric alcohol (C) determines the cross-linking of the molecules. Therefore, if the proportion of the component (C) increases, the cross-linkage increases to render the material thermally stable but the flexibility of the material is lost. If the proportion of the component (C) decreases, the cross-linking is reduced and the material becomes thermally unstable, but the material becomes flexible. When the equivalent proportion of the component (C) exceeds 55 equivalent %, the thermal stability is enhanced, but the solderability becomes poor and the flexibility is lost. When a wire enamel containing the component (C) in an amount exceeding 55 equivalent % is coated, for example, on a conductor with a diameter of 1 mm and baked thereon to form an insulation layer having a thickness of about 40 microns, cracks occur in the insulated wire at winding own diameter.

The poor flexibility is ascribable to an increased cross-linking which makes the insulation rigid. When the porportion of the component (C) is less than 40 equivalent %, the cross-linking is reduced, and therefore, the resulting material does not exhibit good thermal stability.

The component (C) should be an aliphatic polyhydric alcohol which is trihydric or higher. Aromatic polyhydric alcohols which are trihydric or higher or isocyanurated polyols which are trihydric or higher result in extremely poor solderability, and may provide insulated wires which are substantially not solderable. Soldering is carried out by decomposing the insulation coating in a solder bath. In order that the insulated wire be solderable, the decomposition product of the insulation coating is preferably vaporized, and reduced to ash and separated from the conductor. It is not preferred that the decomposition products be carbonized and remain on the conductor. Considering solderability only, a substance which is readily separable into small particles at the time of the decomposition of the molecules of the insulation coating is preferred. Accordingly, the component (C) which contributes to cross-linking should be an aliphatic polyhydric alcohol which is trihydric or higher. For example, aromatic polyhydric alcohols which are trihydric or higher or isocyanurated polyols which are trihydric or higher are thermally stable, are difficult to decompose, and tend to remain on the conductor in the carbonized state even after decomposition. From their structures, these compounds are believed to be of a structure similar to thermally stable graphite at the time of carbonization after decomposition.

A part of the component (C) can be replaced by an aromatic polyhydric alcohol which is trihydric or higher or an isocyanurated polyol which is trihydric or higher. But this is not a desirable from the standpoint of solderability.

If the equivalent proportion of the aliphatic polyhydric alcohol as component (C) is increased, poor solderability of the resulting insulation wire results for the same reason as stated above. If the equivalent proportion of the component (C) increases, the number of cross-linked points increases and it becomes difficult to decompose it into small particles.

Even if the equivalent proportion of the component (C) is 40 to 55 equivalent %, but the proportion of the component (B) (a dicarboxylic acid containing a 5-membered imide ring or its derivative or a mixture of these) is less than 20 equivalent %, poor thermal resistance and solderability of the insulated wire results. The fact that poor solderability appears to be inconsistent, but this fact was discovered for the first time by the present inventors and removes the conventional concept that when thermal stability is improved, the solderability decreases. This is the essence of the present invention.

The reason for this apparent inconsistency was considered on the basis of thoughts on a thermally stable structure and the density of cross-linking. For example, comparison is made between a wire enamel containing the component (B) and a wire enamel which does not contain the component (B) with the equivalent proportion of (C) being the same for both. When the component (B) is not used, the wire enamel has a polyester structure, whereas when the component (B) is used, the wire enamel has a polyesterimide structure. It is well known that if the equivalent proportion of the component (C) is the same for both, the polyesterimide is better in thermal stability than the polyester, and this as a matter of course also arises from the thermally stable structure of the 5-membered imide. Thus, it will be clear that if the equivalent proportion of the component (B) is increased, the thermal stability naturally increases. From the standpoint of the cross-lined structure, the number of cross-links is the same for both since the equivalent proportion of the component (C) is the same. However, since component (B) has a higher molecular weight than the dicarboxylic acid or its derivative or a mixture of these as component (A), the use of the component (B) leads to a low cross-linking density, and the non-use of the component (B) gives rise to a high density of cross-linkages. The higher the density of cross-linkage, the more difficult it is to decompose the wire enamel coating into small particles, namely to solder it. In other words, when the component (B) is used, soldering is easy, and when it is not used, soldering becomes difficult. Accordingly, when the equivalent proportion increases, soldering becomes easier.

For this reason, when the equivalent proportion of the component (B) (the dicarboxylic acid containing a 5- membered imide or its derivative or a mixture of these) is less than 20%, the thermal stability and the solderability of the insulated wire both become poor.

Even if the equivalent proportion of the component (C) is 40 to 55% and that of the component (B) is at least 20% by weight, but the equivalent proportion of the component (A) (the dicarboxylic acid not containing a 5-membered imide ring or its derivative or a mixture of these) is less than 10 equivalent %, it is difficult to produce a wire enamel, and an insulated wire of good appearance is difficult to obtain. Furthermore, the resulting insulated wire, for example, a wire consisting of a conductor with a diameter of 1 mm and an insulated layer having a thickness of about 40 microns, cracks at winding own diameter and becomes useless as an enamelled wire. The reasons for this is as follows: If the equivalent proportion of the component (C) is fixed, the decrease of the proportion of component (A) means an increase in the proportion of the component (B). Since the component (B) generally has a high melting point and is difficult to melt during reaction, introduction of component (B) into the reaction system uniformly is difficult. Thus, the larger the equivalent proportion of the component (B), the more difficult it is to produce a reaction product between the components (A), (B), (C) and (D). Further, the larger the proportion of the component (B) in the insulation coating is, the higher the melt viscosity of the coating at the the time of application and baking is, in which case bubbles are more liable to occur upon evaporation of the solvent.

Furthermore, if the equivalent proportion of the component (B) is large, the insulation coating becomes rigid, the flexibility is lost, and cracks tend to occur. Especially when the proportion of the component (A) is less than 10 equivalent %, these defects appear remarkably.

Thus, it has been found that the equivalent proportions of the components (A), (B) and (C) which provide good thermal stability, good solderability, good flexibility effective as an enamelled wire, and a smooth surface are within the range shown by the hatched portion of the Figure, namely, 10 to 40 equivalent % for the component (A), 20 to 50 equivalent % for the component (B), and 40 to 55 equivalent % for the component (C).

The components (A), (B), (C) and (D) do not necessarily represent the starting materials per se used in producing the intended insulation coating. These components represent the essential nature of the starting materials as constituents that exert effects on the characteristics of the insulated wire. Accordingly, the components (A) and (B) are characterized as carboxylic acids or their derivatives or mixtures thereof, and the components (C) and (D) are characterized as alcohols. However, various cases are involved in using a reaction product of these, for example, using the reaction product of each, using a product obtained by decomposing this reaction product, using materials before forming the reaction product, or using a precursor thereof. It goes without saying that these components should be (A), (B), (C) and (D) as the basic components which affect the properties of the insulation coating obtained by applying the resulting wire enamel to a conductor and baking the coating thereon.

With respect to component (A), which is a dicarboxylic acid not containing a 5-membered imide ring or its derivative or its mixture, the dicarboxylic acid can be aromatic, alicyclic or aliphatic dicarboxylic acids, with the aromatic dicarboxylic acids being preferred. The dicarboxylic acids are expressed by the general formula HOOC — R — COOH in which R is a divalent group containing at least two carbon atoms. Examples of aromatic dicarboxylic acids are isophthalic acid, terephthalic acid, 1,2-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, diphenyl-2,2'-dicarboxylic acid, diphenyl-2,3'-dicarboxylic acid, diphenyl-2,4'-dicarboxylic acid, diphenyl- 3,3'-dicarboxylic acid, diphenyl-4,4'-dicarboxylic acid, diphenylmethane-2,2'-dicarboxylic acid, diphenylmethane-4,4'-dicarboxylic acid, diphenylethane-4,4'-dicarboxylic acid, diphenylsulfone-4,4'-dicarboxylic acid, benzophenone-4,4'-dicarboxylic acid, and diphenyl-2,2-propane-4,4'-dicarboxylic acid.

The dicarboxylic acids which are suitable also include those expressed by the general formula

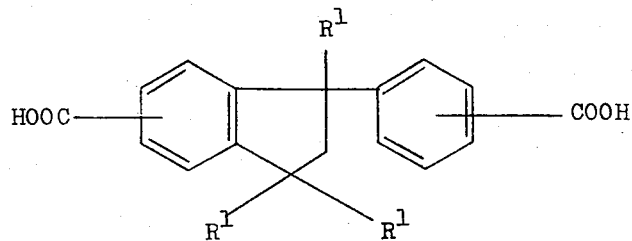

wherein $R^1$ is a hydrogen atom or an alkyl group containing 1 to 3 carbon atoms.

Examples of aliphatic dicarboxylic acids are adipic acids succinic acid, maleic acid, sebacic acid, isosebacic acid, and dimeric acid.

Alicyclic dicarboxylic acids of the general formula

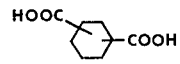

in which

is a cyclohexyl group or

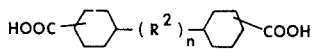

in which

is a cyclohexyl group, R² is —O—, —CH₂, —(CH₂)₂—, —C(CH₃)₂—, —SO₂—, Si(CH₃)₂, or

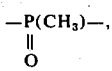

and n is a positive integer can also be used.

Examples of these dicarboxylic acids are hexahydroisophthalic acid (cis- and trans- or a mixture of these), hexahydroterephthalic acid (cis- and trans- or a mixture of these), and bicyclo[2,2,2] octane-1,4-dicarboxylic acid.

The derivative can be an ester, such as a lower dialkyl ester of the above carboxylic acid, for example, dimethyl terephthalate, diethyl terephthalate, dipropyl terephthalate, dibutyl terephthalate, diamyl terephthalate, dihexyl terephthalate, or dioctyl terephthalate when the carboxylic acid is terephthalic acid. A half ester of such a carboxylic acid such as monomethyl terephthalate is also suitable. Other derivatives include the dihalides of the above carboxylic acids, such as the carboxylic acid dichlorides, and the acid anhydrides of these carboxylic acids, such as phthalic anhydride. These carboxylic acids and their derivatives can be used either alone or as a mixture.

Terephthalic acid, isophthalic acid, or their derivatives, or those derived by replacing a portion of these by another dicarboxylic acid or its derivative are especially preferred as component (A).

As long as the effects of the present invention are not reduced, component (A) can be replaced in part by a polycarboxylic acid which is a tricarboxylic acid or higher carboxylic acid or derivative thereof. Examples of such a polycarboxylic acid or its derivative are trimellitic acid, trimellitic anhydride, hemimellitic acid, hemimellitic anhydride, trimesic acid, and trimesic anhydride.

The component (B) in this invention is a carboxylic acid containing a 5-membered imide ring or its mixture, but so long as the effects of the present invention are not reduced, a portion of component (B) can be replaced by a polycarboxylic acid containing a 5-membered imide ring which is tricarboxylic acid or higher carboxylic acid, or its derivative or its mixture. The dicarboxylic acid or higher carboxylic acid containing a 5-membered imide is obtained by reacting a compound (1) below with a compound (2) below, or by reacting a compound (1) below with a compound (3) below.

1. An aromatic carboxylic anhydride containing a five-membered ring carboxylic anhydride group and at least one reactive group. The reactive group can be a carboxyl group or a carboxylic anhydride group. Instead of the cyclic carboxylic anhydride group, two carboxyl groups bonded to the adjacent carbon atoms or esters thereof or half esters thereof, or as long as an imide group can be formed, the half amides with a primary amine described in (2) below, can also be used.

2. A primary amine containing a primary amino group and at least one other reactive group. The reactive group can be a carboxyl group or a primary amino group. Instead of the primary amine, a salt of the amine, an amide, a lactam or a polyamide can be used so long as the primary amino group bonded can contribute to the formation of an imide.

3. A polyisocyanate compound.

Examples of the compound (1), which contains a cyclic carboxylic anhydride group and another functional group, are tricarboxylic acid anhydrides such as trimellitic anhydride, hemimellitic anhydride, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'-diphenylether tricarboxylic anhydride, or 3,4,4'-benzophenonetricarboxylic anhydride, and tetracarboxylic dianhydrides such as pyromellitic dianhydride, 2,3,6,7-naphthalenetetracarboxylic dianhydride, 1,8,4,5-naphthalenetetracarboxylic dianhydride, 1,2,5,6-naphthalenetetracarboxylic dianhydride, 3,3'-4,4'-diphenyltetracarboxylic dianhydride, 2,2',3,3'-diphenyltetracarboxylic dianhydride, 3,3'4,4'-diphenylethertetracarboxylic dianhydride, 3,3',4,4'-diphenylmethanetetracarboxylic dianhydride, or 3,3', 4,4'-bezophenonetetracarboxylic dianhydride. Trimellitic anhydride is especially preferred.

Examples of the compound (2) which contains a primary amino group and other functional groups are primary diamines such as 4,4'-diaminodiphenyl methane, 4,4'-diaminodiphenyl ether, benzidine, 3,3'-diaminodiphenyl, 1,4-diaminonaphthalene, m-phenylene diamine, p-phenylene diamine, α,ω-nonamethylene diamine, 1,7-dimethylheptamethylene diamine, 4,4'-diaminodiphenyl ketone, bis-(4-aminophenyl)-α,α'-p-xylene, tolylene diamine, xylylene diamine, hexamethylene diamine, ethylene diamine, 4,4'-dicyclohexylmethane diamine, or diaminodiphenyl sulfone benzoguanamine (containing an amide bond in the molecule and preferably being an aromatic diamine); and aminocarboxylic acids such as glycocoll (glycine), aminopropionic acid, aminocaproic acid, or aminobenzoic acid.

Examples of the polyisocyanate compound (3) are mononuclear polyisocyanates such as m-phenylene diisocyanate, 2,4-tolylene diisocyanate or 2,6-tolylene diisocyanate; aromatic polyisocyanates having a number of rings or a fused ring, such as diphenyl ether-4,4'-diisocyanate, diphenylmethane-4,4'-diisocyanate, diphenylmethane-2,4'-diisocyanate, diphenylmethane-2,2'-diisocyanate, diphenylsulfone-4,4'-diisocyanate, diphenylthioether-4,4'-diisocyanate, or naphthalenediisocyanate; polymethylenepolyphenylene polyisocyanate, hexamethylene diisocyanate, or xylylene diisocyanate; and blocked isocyanates obtained by stabilizing the isocyanate groups of these polyisocyanates with, for example, a phenolic hydroxyl group.

The most preferred dicarboxylic acids containing a 5-membered imide ring are those of the formula

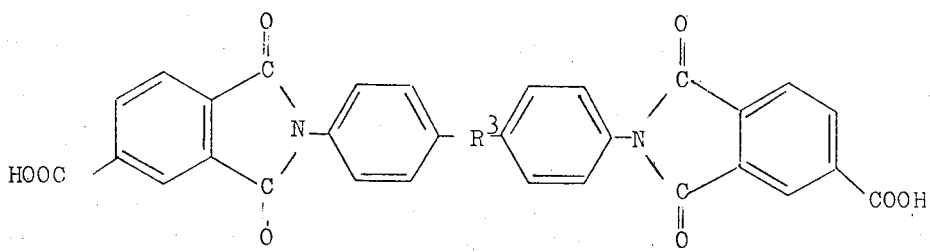

wherein R³ is —CH₂—, —O— or —SO₂—,
which are obtained from 2 mols of trimellitic anhydride and 1 mol of either 4,4'-diaminodiphenyl methane, 4,4'-diaminodiphenyl ether, diphenylmethane-4,4'-diisocyanate, diphenylether-4,4'-diisocyanate or diphenylsulfone-4,4'-diisocyanate.

Also, those of the following formula

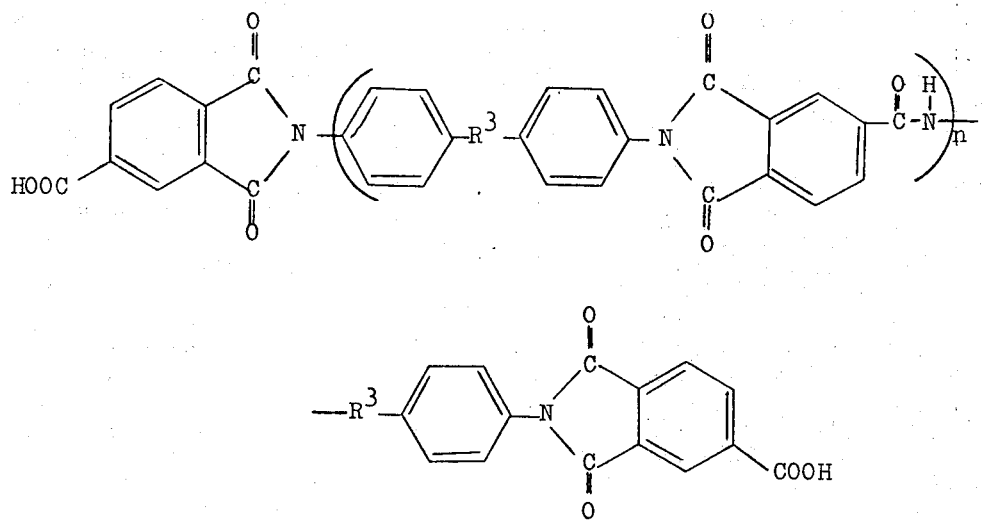

wherein R is —CH₂—, —O— or —SO₂—, and n is preferably above 0 but not more than 4 on the average,
which are obtained from 2 mols of trimellitic anhydride and 1 to 2 mols of either 4,4'-diaminodiphenylmethane, 4,4'-diaminodiphenyl ether, diphenylmethane-4,4'-diisocyanate, diphenylether-4,4'-diisocyanate, or diphenylsulfone-4,4'-diisocyanate can be used.

In (1) above, a part of the aromatic carboxylic anhydride can be replaced by a dicarboxylic acid to form an amide bond. Furthermore, it is possible to react 1 mol of a dicarboxylic acid or its derivative (e.g., the acid halide) with 0.5 to 1 mol of a diamine to form a diamine having a terminal amino group and use the product as (2). Alternatively, it is possible to use a diamine having an amide group in the molecule as (2). The dicarboxylic acid, referred to herein, is, for example, terephthalic acid, isophthalic acid, a phenylindanedicarboxylic acid of the general formula

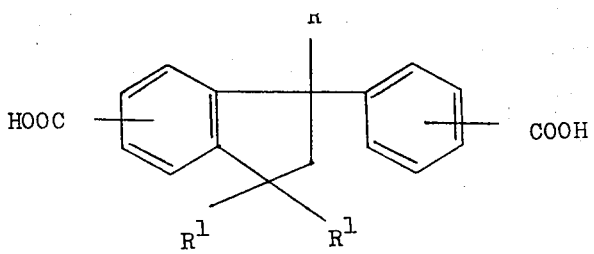

wherein R¹ is a hydrogen atom or an alkyl group containing 1 to 3 carbon atoms,
such as 3-(4-carboxyphenyl)-5-indanecarboxylic acid, 3-(3-carboxyphenyl)-5-indanecarboxylic acid, 3-(3-carboxyphenyl)1,1,3-triethyl-6-indanecarboxylic acid, 3-(4-carboxyphenyl)-1-methyl-1,3-dipropyl-5-indanecarboxylic acid, or 3-(4-carboxyphenyl)-1-methyl-1,3-diethyl-6-indanecarboxylic acid, phthalic acid, phthalic anhydride, hexahydroterephthalic acid, hexahydroisophthalic acid, adipic acid, succinic acid, maleic acid, sebacic acid, isosebacic acid, dimeric acid, tetrachlorophthalic acid, hexachloroendomethylene tetrahydrophthalic acid, 4,4'-dicarboxy-diphenylmethane, 4,4'-dicarboxy-diphenylpropane, and benzophenonedicarboxylic acid. The derivative thereof can be the acid dihalides of these dicarboxylic acids, such as the acid dichloride.

These polycarboxylic acids containing a 5-membered imide ring can be obtained by reacting the compounds (1) with the compounds (2) or reacting the compounds (1) with the compounds (3) in the presence or absence of a solvent. In the reaction of the compounds (1) with the compounds (3), a small amount of a solvent as exemplified below is used and if desired, a small amount of an isocyanate activating catalyst is added; and the reaction is performed substantially in the molten or solid state although it can be affected in a solvent, thereby to form the polycarboxylic acids containing a 5-membered imide.

The solvent that can be used for preparing the above polycarboxylic acid containing a 5-membered imide can, for example, be N-methyl-2-pyrrolidone, N,N-dimethylacetamide, N,N-dimethylformamide, N,N-diethylformamide, N,N-diethylacetamide, dimethyl sulfoxide, N-methylcaprolactam, cresolic acid, phenol, o-cresol, m-cresol, p-cresol, 2,3-xylenol, 2,5-xylenol, 2,6- xylenol, 3,4-xylenol, or 3,5-xylenol. Aliphatic hydrocarbons, aromatic hydrocarbons, halogenated hydrocarbons, ethers, ketones, and esters can also be used; specific examples of these include benzene, toluene, xylene, ethylbenzene, diethylbenzene, isopropylbenzene, petroleum naphtha, coal tar naphtha, solvent naphtha, acetone, methyl ethyl ketone, methyl isobutyl ketone, methyl acetate, and ethyl acetate.

These solvents can be used either alone or as a mixture.

The derivatives of the above polycarboxylic acids containing a 5-membered imide ring are, for example, their esters or acid halide. As component (B) not only one of the above-exemplified polycarboxylic acids or the derivatives thereof, but also a mixture of these can be used.

The aliphatic polyhydric alcohol which is trihydric or higher used as the component (C) is an alcohol having neither an aromatic nor a heterocyclic ring at any position of the molecule. Examples of such polyhydric alcohols are glycerol, pentaerythritol, 1,1,1-trimethylolethane, 1,1,1-trimethylol propane sorbitol, mannitol, dipentaerythritol, diglycerol, and 1,2,6-hexanetriol.

As long as the effects of the present invention are not reduced, a portion of the aliphatic polyhydric alcohol as component (C) can be replaced by an alcohol containing an aromatic ring or heterocyclic ring which is trihydric or higher. Examples of these other alcohols are tris-($\beta$-hydroxyethyl) isocyanurate, and tris-($\beta$-hydroxypropyl) isocyanurate. However, since this aromatic or heterocyclic polyhydric alcohol remarkably reduces the solderability of the insulated wire, it is not so preferable to replace a portion of the component (C) by it. Even if this replacement is to be made, only a small portion of the component (C) should be replaced, and it is preferred that the component (C) be composed substantially solely of the aliphatic polyhydric alcohol described above.

Examples of suitable dihydric alcohols as component (D) are ethylene glycol, diethylene glycol, triethylene glycol, 1,2-propylene glycol, 1,3-propanediol, butanediol-1,3 or 1,4, pentanediol-1,5, hexanediol-1,6 butene-2-diol-1,4, or 2,2-dimethylpropanediol-1,3,2-ethyl-2-butyl-propanediol-1,8, 1,4-dimethylolcyclohexane, butenediol-1,4, hydrogenated bisphenols (for example, hydrogenated p,p'-dihydroxydiphenylpropane or its homologs), cyclic glycols such as 2,2,4,4-tetramethyl-1,3-cyclobutanediol, hydroquinone-di-$\beta$-hydroxyethyl-ether, 1,4-cyclohexanedimethanol, 1,4-cyclohexane diethanol diethylene glycol, triethylene glycol, tetraethylene glycol, dipropylene glycol, trimethylene glycol, hexylene glycol, or octylene glycol.

As previously described, these components (A), (B), (C) and (D) are the most basic forms of the starting materials as constituents that affect the characteristics of the insulating wire. Accordingly, in the manufacture of wire enamels, the materials can be used various forms, such as in the form of the reaction products thereof, products obtained by the decomposition of the reaction products, the starting materials before the formation of such reaction products, or precursors of such.

Some examples will be given hereinafter as to the form of the starting materials.

One example of using a reaction product is to use a reaction product between the components (A) and (D), such as bis-(hydroxyethyl) isophthalate or bis-(hydroxyethyl) terephthalate. The bis-(hydroxyethyl) terephthalate is sometimes used as a material for the production of a wire enamel. However, in the present invention, this is considered by all means to be composed of the components (A) and (D), and not only as the dihydric alcohol (D). In this case, the component (A) is, for example, terephthalic acid, and the component (D) is ethylene glycol.

It is also possible to use a compound of the following formula

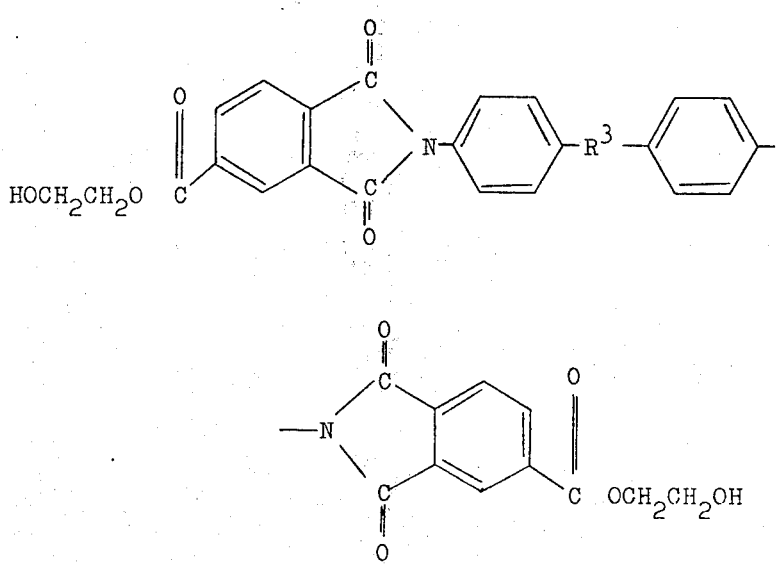

wherein $R^3$ is $-CH_2-$, $-O-$ or $-SO_2-$, which is a reaction product between the components (B) and (D). Like the first example set forth, this is also a dihydric alcohol when its structure is considered. But in the present invention, this is considered to be composed of the components (B) and (D), and not as the dihydric alcohol (D) only. In this case, the component (B) is expressed, for example, by the following general formula

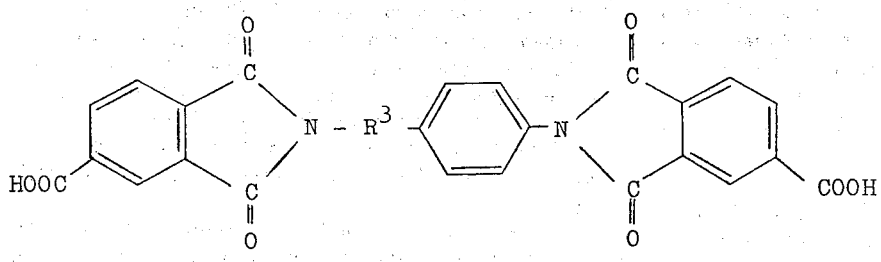

and the component (D) is ethylene glycol.

As the case of using the decomposed reaction product, the use of a product obtained by decomposing a reaction product between (A) and (D) is examplary. A high-molecular-weight linear polyester or a decomposition product thereof can also be used. The high-molecular-weight straight-chain polyester is, for example, polyethylene terephthalate, polyethylene isophthalate, polyethylene isophthalate-terephthalate coester, polytetramethylene isophthalate, polytetramethylene terephthalate, polyethylene adipate, poly (1,4-cyclohexanedicarbinyl terephthalate), poly (1,4-cyclohexanedicarbinyl isophthalate), or polyethylene terephthalate-phenylindanedicarboxylate coester. These linear polyesters are produced on a large commercial scale as resins for fabricating fibers or films, and are readily available. The wastes which occur during the manufacture or processing of these polyesters can also be used. The use of such a material is very effective and advantageous from a commercial stand point.

In this case also, the material used is considered to be composed of the components (A) and (D). For example, even when both end groups of the polyethylene terephthalate are hydroxyl groups, it is not considered to be a dihydric alcohol (D) only, but to be composed of the components (A) and (D). In this case, the component (A) is, for example, terephthalic acid, and the component (D) is ethylene glycol.

As an example of using the materials before the formation of the components (A), (B), (C) and (D), there is a case of using the compounds (1) and (2) or (1 ) and (3) in a solvent or in the absence of a solvent, as described above with respect to the component (B) which is a polycarboxylic acid containing a 5-membered imide can be used as such. These 4aterials 4ay be used in the form that exists before the formation of a 5-membered imide by reacting the compounds (1) and (2), that is in the form of amido acid as a precursor.

Thus, each of the components can be used in various forms, and one or more than one compounds in admixture can be used as each of these components. The reaction sequence employed is also optional.

The resin obtained by reacting the components (A), (B), (C) and (D) is dissolved in a solvent to form wire enamel. Examples of suitable solvents are solvents containing a phenolic hydroxyl group such as phenol, o-cresol, m-cresol, p-cresol, o-ethylphenol, m-ethylphenol, p-ethylphenol, 2,3-xylenol, 2,4-xylenol, 2,5-xylenol, 2,6-xylenol, 3,4-xylenol, 3,5-xylenol, o-n-propylphenol, 2,4,6-trimethylphenol, 2,3,5-trimethylphenol, 2,4,5-trimethylphenol, 4-ethyl-2-methylphenol, 5-ethyl-2-methylphenol, and cresolic acid; and polar solvents such as N,N-dimethylacetamide or N-methyl-2-pyrrolidone. As a diluent, an aliphatic hydrocarbon, aromatic hydrocarbon, halogenated hydrocarbon, ether, acetal, ketone or ester can be used. Examples of aliphatic hydrocarbons and aromatic hydrocarbons are n-heptane, n-octane, cyclohexane, decalin dipentene, pinen, p-menthane, decane, dodecane, tetradecane, benzene, toluene, xylene, ethylbenzene, diethylbenzene, isopropylbenzene, amylbenzene, p-cymene, tetralin, mixtures of these, petroleum naphtha, coal tar naphtha, and solvent naphtha.

The wire enamel so obtained is coated on a conductor and baked to produce an insulated wire. At this time, the use of a small amount of a metal drying agent is useful. Such a metal drying agent can be, for example, an octoate, naphthenate, resinate, or linolate of zinc, calcium, lead or cadmium. Specific examples include zince octoate, cadmium octoate, cadmium naphthenate, calcium naphthenate, zinc naphthenate, lead naphthenate, lead linolate, calcium linolate, cadmium resinate, and zinc resinate. Manganese naphthenate and cobalt naphthenate are also useful. Instead of, or in conjunction with, the above described metal dryer, a tetraalkyl titanate or its derivative (a tetraalkyl titanium chelate or tetraalkyl titanium acylate) can effectively be used.

Typical examples of tetraalkyl titanates are tetraisopropyl titanate, tetrabutyl titanate, tetrahexyl titanate, tetramethyl titanate, tetrapropyl titanate, and tetraoctyl titanate. Examples of tetraalkyl titanium chelates are the products obtained by reacting tetraalkyl titanates with octylene glycol, triethanolamine or an acetoacetic acid ester. The tetraalkyl titanium acylate can, for example, be a reaction product formed between a tetraalkyl titanate with stearic acid.

A polyisocyanate or an isocyanate regenerated product obtained by blocking the isocyanate group of the polyisocyanate with phenol, cresol, etc. can be used as a curing agent or cross-linking agent. Examples of the curing agent are 4,4',4''-triphenylmethane triisocyanate (Desmodur R trade name of Bayer AG), a cyclic trimer of 2,6-tolylene diisocyanate, a trimer of 4,4'-diphenylmethane diisocyanate, a reaction product obtained from 3 mols of 2,4-tolylenediisocyanate and 1 mol of trimethylol propane, a reaction product formed from 3 mols of 2,6-tolylene diisocyanate and 1 mol of trimethylol propane, a reaction product formed from 3 mols of 2,4-tolylene diisocyanate and 1 mol of trimethylol ethane, and the products obtained by blocking the isocyanate group of these isocyanates with phenol or cresol, etc.

So long as the effects of the present invention are not reduced, a polyamide resin, a phenol resin, a melamineformaldehyde resin, an epoxy resin, a urea resin or a silicone resin can be used in conjunction with the above described titanium compound or polyisocyanate (or its derivative).

The addition of silicone, a fluorine-type surface active agent, or a low-molecular-weight polyethylene, etc. is also preferred. This can contribute to the reduction of the coefficient of friction of the insulated wire and therefore to the increase of windability.

It is also preferred to form a polyamide insulation layer on the insulated wire obtained in this invention. The polyamide insulation layer has a low coefficient of friction, and serves to increase the windability of the insulated wire. A suitable polyamide material is, for example, 6-nylon or 6,6-nylon.

It is also preferred to form a self-bonding layer on the insulated wire obtained in this invention to produce a self-bonding magnet wire. The magnet wire after being wound on a coil is impregnated with a varnish and solidified so that the individual filaments of the wire do not loosen. However, the impregnating step is time-consuming, and an offensive odor is generated by the solvent in the varnish. In order to overcome such a difficulty, self-bonding magnet wires have recently been developed. When the self-bonding magnet wire is heated after formation of a coil, the individual constituent filaments are bonded to each other to prevent the separation of the filaments from each other. This, therefore, obviates the troublesome step of treating with a varnish, and the problem of an offensive odor of the solvent.

Accordingly, by providing a self-bonding layer on the insulated wire of this invention, the step of impregnation treatment can be omitted, and obtained an insulated wire having good thermal stability and permitting easy insulation removal is obtained. The self-bonding layer can, for example, be composed of polyvinyl butyral, phenoxy, polyamide, polysulfone, etc. resin.

The following Examples, Referential Examples, and Comparative Examples are given to illustrate the present invention in greater detail but the invention is in no way to be construed as limited thereby. Unless otherwise indicated, all parts, percents, ratios and the like are by weight.

REFERENTIAL EXAMPLE 1

Trimellitic anhydride (1921 g=10 mols) was dispersed in 6000 g of cresol, and then a solution of 991 g (5 mols) of 4,4'-diaminodiphenyl methane in 3000 g of cresol was added dropwise gradually to the dispersion. The temperature was inreased to 150°C. over the course of 3 hours, and the mixture was allowed to react for 3 hours at this temperature. After cooling, a precipitate of pale yellow microcrystals was obtained. The product was washed several times with acetone, and filtered to form diimidodicarboxylic acid.

REFERENTIAL EXAMPLE 2

Trimellitic anhydride (1921 g=10 mols) was allowed to react with 1001 g (5 mols) of 4,4'-diaminodiphenyl ether in cresol in the same way as in Referential Example 1 to form diimidodicarboxylic acid.

REFERENTIAL EXAMPLE 3

Trimellitic anhydride (1921 g=10 mols) was allowed to react with 1371 g(10 mols) of p-aminobenzoic acid in cresol in the same way as in Referential Example 1 to form imidodicarboxylic acid.

REFERENTIAL EXAMPLE 4

Pyromellitic anhydride (1091 g=5 mols) was allowed to react with 1371 g (10 mols) of p-aminobenzoic acid in cresol in the same way as in Referential Example 1 to form diimidodicarboxylic acid.

REFERENTIAL EXAMPLE 5

150 Grams of solvent naptha (boiling point 165° to 175°C.) was added to 384 g (2 mols) of trimellitic anhydride and 250 g (1 mol) of diphenylmethane-4,4'-diisocyanate, and the reactants were allowed to react for 1 hour at 140°C. and for 3 hours at 150°C. as the reaction progressed, the trimellitic anhydride was dissolved and became uniformly transparent with a pale yellow color. As the reaction progressed further, it foamed and solidified. The solid product was pulverized and a dicarboxylic acid containing a 5-membered imide was obtained.

REFERENTIAL EXAMPLE 6

384 Grams (2 mols) of trimellitic anhydride was allowed to react with 252 g (1 mol) of diphenylether-4,4'-diisocyanate in 2 g of N-methyl-2-pyrrolidone for 1 hour at 120°C. and then for 1 hour at 140°C. to form a uniformly transparent solution having a pale yellow color, which was foamed and solidified. 150 Grams of solvent naphtha (boiling point 165° to 175°C.) was added, and the solution was further heated at 150°C. for one hour. The reaction product was pulverized to form a dicarboxylic acid containing a 5-membered imide.

REFERENTIAL EXAMPLE 7

384.2 Grams of trimellitic anhydride was allowed to react with 266 g of polymethylenepolyphenylene isocyanate (PAPI, isocyanate equivalent 138.5, the product of Sumitomo Chemical Co. Ltd.; having the following formula)

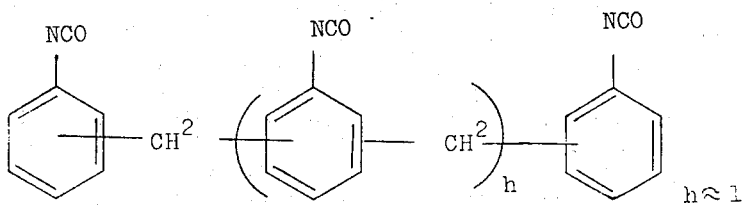

in 200 g of solvent naphtha (boiling point 150°–190°C.) for 3 hours at 140°C. and for 2 hours at 150°C. to form a dark brown substance. This substance was pulverized to form a polycarboxylic acid containing a 5-membered imide ring.

COMPARATIVE EXAMPLE 1

146 Grams (1.5 equivalents) of dimethyl terephthalate, 124 g (4.0 equivalents) of ethylene glycol, 184 g (6.0 equivalents) of glycerine, 0.2 g of litharge, and 200 g of xylene were mixed with stirring, and heated to 140° to 170°C., and the reaction was performed at this temperature for 5 hours, while distilling off the low boiling distillates, the temperature was increased gradually to 180°C. 683 g (2.5 equivalents) of the dicarboxylic acid obtained in Referential Example 5 was gradually added, and the temperature was maintained at 200°C. After the dicarboxylic acid containing a 5-membered imide ring was completely absorbed by the reaction system, the reaction system was gradually heated to 240°C. The reaction system was then distilled at reduced pressure, and when it became sufficiently viscous, cresol was added to form a solution having a solids content of 35%.

Tetrabutyl titanate was added in an amount of 2% based on the total solid resin content, and the mixture was stirred to form a wire enamel. The enamel was coated and baked in a customary manner. The properties of the insulated wire obtained are shown in Table 1.

In the manufacture of the insulated wire, much foaming occurred, and it was impossible to obtain an insulated wire of smooth surface.

COMPARATIVE EXAMPLE 2

A wire enamel was prepared in the same way as in Comparative Example 1 using 340 g (3.5 equivalents) of dimethylphthalate, 202 g (6.5 equivalents) of ethylene glycol, 107 g (3.5 equivalents) of glycerol, 0.2 g of cadmium acetate, 300 g of xylene and 819 g (3.0 equivalents) of the dicarboxylic acid containing a 5-membered imide ring which was obtained in Referential Example 5. The wire enamel was coated and baked in a customary manner. The properties of the insulated wire obtained are shown in Table 1.

COMPARATIVE EXAMPLE 3

A wire enamel was prepared in the same way as in Example 1 using 340 g (3.5 equivalents) of dimethyl terephthalate, 155 g (5.0 equivalents) of ethylene glycol, 154 g (5.0 equivalents) of glycerol, 0.2 g of litharge, 300 g of xylene and 410 g (1.5 equivalents) of the dicarboxylic acid containing a 5-membered imide ring which was obtained in Referential Example 5. The wire enamel was coated and baked in a customary manner. The properties of the insulated wire obtained are shown in Table 1.

COMPARATIVE EXAMPLE 4

A wire enamel was prepared in the same way as in Comparative Example 1 using 48 g (0.5 equivalent) of dimethyl terephthalate, 155 g (5.0 equivalents) of ethylene glycol, 154 g (5.0 equivalents) of glycerol, 0.5 g of litharge, 100 g of xylene and 1229 g (4.5 equivalents) of the dicarboxylic acid containing a 5-membered imide ring which was obtained in Referential Example 5. The wire enamel was coated and baked in a customary manner. The properties of the insulated wire obtained are shown in Table 1. In the manufacture of the insulated wire, much foaming occurred, and it was impossible to obtain an insulated wire having a smooth surface.

COMPARATIVE EXAMPLE 5

243 g (2.5 equivalents) of dimethyl terephthalate, 155 g (5.0 equivalents) of ethylene glycol, 436 g (5.0 equivalents) of tris(2-hydroxyethyl) isocyanurate, 0.2 g of litharge, and 250 g of xylene were mixed with stirring, and heated to 140°–170°C. The reaction was performed at this temperature for 5 hours, and while distilling off the low-boiling distillates, the reaction mixture was gradually heated to 180°C. Then, 683 g (2.5 equivalents) of the dicarboxylic acid containing a 5-membered imide ring which was obtained in Referential Example 5 was gradually added, and the mixture was maintained at 200°C. After the dicarboxylic acid containing a 5-membered imide was completely absorbed by the reaction system, the reaction system was gradually heated up to 230°C. When the reaction mixture became sufficiently viscous, cresol was added to form a solution having a solids content of 35%. Tetrabutyl titanate was added to the solution in an amount of 2% based on the total solid resin content, and the mixture was stirred to form a wire enamel. The resulting wire enamel was coated and baked in a customary manner. The properties of the insulated wire obtained are shown in Table 1.

COMPARATIVE EXAMPLE 6

486 g (5.0 equivalents) of dimethyl terephthalate, 154 g (5.0 equivalents) of glycerol, 155 g (5.0 equivalents) of ethylene glycol, 0.3 g of cadmium acetate and 300 g of xylene were mixed with stirring, and heated at 130° to 140°C. for 5 hours. The low boiling distillates were distilled off, and then the reaction mixture was gradually heated, and while distilling off the low-boiling distillates, the reaction mixture was heated to 240°C. When the reaction product became viscous, cresol was added to form a solution having a solids content of 40%. Tetrabutyl titanate was added to the solution in an amount of 4% based on the total solid resin content to form a wire enamel.

The wire enamel was coated and baked in a customary manner. The properties of the insulated wire obtained are shown in Table 1.

COMPARATIVE EXAMPLE 7

192 g (1.0 mol) of trimellitic anhydride and 250 g (1.0 mol) of diphenylmethane-4,4'-diisocyanate were added to a mixed solvent of 630 g of N-methyl-2-pyrrolidone and 270 g of solvent naphtha (Swasol No. 1000, the product of Maruzen Oil Co., Ltd.), and the reaction was performed at 80°C. for 3 hours. Then, the reaction mixture was heated to 165°C. over the course of 6 hours, and then further reacted at this temperature for 2 hours to form a polyamideimide wire enamel. The wire enamel was coated and baked in a customary manner. The properties of the insulated wire obtained are shown in Table 1.

EXAMPLE 1

240 g of polyethylene terephthalate (Mylar, trade name, the product of Du Pont), 154 g (5.0 equivalents) of glycerol and 0.5 g of litharge were heated at 250°C. After the polyethylene terephthalate was dissolved completely, the temperature was lowered to 180°C. 155 g (5.0 equivalents) of ethylene glycol was added to the reaction mixture, and further, 683 g (2.5 equivalents) of the dicarboxylic acid containing a 5-membered imide ring which was obtained in Referential Example 5 was gradually added. The mixture was allowed to react at 200°C. After the dicarboxylic acid containing a 5-membered imide ring was dissolved, the reaction mixture was heated to 240°C. and distilled at reduced pressure. When the reaction mixture became fully viscous, cresol was added to form a solution having a solids content of 35%. Tetrabutyl titanate was added to the solution in an amount of 4% based on the total solid resin content, and the mixture was stirred to form a wire enamel. The wire enamel was coated and baked in a customary manner. The properties of the insulated wire obtained are shown in Table 1.

In performing the above reaction, low-boiling distillates can be distilled off, if desired.

EXAMPLE 2

291 g (3.0 equivalents) of dimethyl terephthalate, 171 g (5.5 equivalents) of ethylene glycol, 138 g (4.5 equivalents) of glycerol, 0.2 g of litharge and 250 g of xylene were mixed with stirring, and heated to 140° to 170°C., after which they were allowed to react at this temperature for 5 hours. The reaction mixture was further heated to 180°C. 683 g (2.5 equivalents) of the dicarboxylic acid containing a 5-membered imide ring obtained in Referential Example 5 was added gradually, and the reaction mixture was maintained at 200°C. After the dicarboxylic acid containing a 5-membered imide ring was completely absorbed by the reaction system, the reaction mixture was gradually heated and distilled at reduced pressure. When it became fully viscous, cresol was added to form a solution having a solids content of 40%. Solvent naphtha (Swasol No. 1000, trade name, the product of Maruzen Oil Co., Ltd.) was further added to form a solution having a solid resin content of 35%.

Tetrabutyl titanate was added to the solution in an amount of 3% based on the total solid resin content, and the mixture was stirred to form a wire enamel. The wire enamel was coated and baked in a customary manner. The properties of the insulated wire obtained are shown in Table 1.

In performing the above reaction, low-boiling distillates can be distilled off, if desired.

EXAMPLE 3

A wire enamel was prepared in the same way as in Example 1 using 192 g of polyethylene terephthalate (Tetoron, trade name, the product of Teijin Limited), 154 g (2.0 equivalents) of glycerol, 0.2 g of cadmium acetate, 155 g (5.0 equivalents) of ethylene glycol, 819 g (3.0 equivalents) of the dicarboxylic acid containing a 5-membered imide ring which was obtained in Referential Example 5. The wire enamel was coated and baked in a customary manner. The properties of the insulated wire obtained are shown in Table 1.

EXAMPLE 4

243 g (2.5 equivalents) of dimethyl terephthalate, 171 g (5.5 equivalents) of ethylene glycol, 138 g (4.5 equivalents) of glycerol, 576 g (3.0 mols) of trimellitic anhydride, 297 g (1.5 mols) of 4,4'-diaminodiphenylmethane, 1500 g od cresol, 300 g of xylene and 0.5 g of cadmium acetate were mixed with stirring. While distilling off the low-boiling components, the reaction mixture was gradually heated, and when the temperature reached 210°C., it was maintained at this temperature for 5 hours. Furthermore, the reaction mixture was heated to 240°C. to distill off the cresol at reduced pressure. When the reaction mixture became fully viscous, cresol was added to form a solution having a solid resin content of 35%. Tetrabutyl titanate was added to the solution in an amount of 2% based on the total resin solid content, and the mixture was stirred to form a wire enamel. The wire enamel was coated and baked in a customary manner. The properties of the insulated wire obtained are shown in Table 1.

EXAMPLE 5

A wire enamel was prepared in the same way as in Example 2 using 146 g (1.5 equivalents) of dimethyl terephthalate, 155 g (5.0 equivalents) of ethylene glycol, 154 g (5.0 equivalents) of glycerol, 0.2 g of litharge, 250 g of xylene and 956 g (3.5 equivalents) of the diimidodicarboxylic acid which was obtained in Referential Example 1. The wire enamel was coated and baked in a customary manner. The properties of the insulated wire obtained are shown in Table 1.

EXAMPLE 6

A wire enamel was prepared in the same way as in Example 1 using 192 g of polyethylene terephthalate (Lumirror, trade name, the product of Toray Industries, Inc.), 138 g (4.5 equivalents) of glycerol, 0.2 g of litharge, 171 g (5.5 equivalents) of ethylene glycol and 956 g (3.5 equivalents) of the dimidodicarboxylic acid which was obtained in Referential Example 2. The wire enamel was coated and baked in a customary manner. The properties of the insulated wire obtained are shown in Table 1.

EXAMPLE 7

A wire enamel was prepared in the same way as in Example 2 using 146 g (1.5 equivalents) of dimethyl terephthalate, 171 g (5.5 equivalents) of ethylene glycol, 138 g (4.5 equivalents) of glycerol, 0.4 g of litharge, 300 g of xylene and 1092 g (4.0 equivalents) of the dicarboxylic acid containing a 5-membered imide ring which was obtained in Referential Example 5. The wire enamel was coated and baked in a customary manner. The properties of the insulated wire obtained are shown in Table 1.

EXAMPLE 8

A wire enamel was prepared by dissolving 100 parts by weight of nylon 66 (CM 3001, trade name the product of Toray Industries, Inc.) in 400 g of m-cresol. The wire enamel obtained was coated and baked on the insulated wire obtained in Example 1 to form a polyamide layer with a thickness of 5 microns. The insulated wire having the polyamide layer had a coefficient of static friction of 0.06, which is far lower than that of the insulated wire of Example 1 which was 0.13. The solderability of the insulated wire obtained in this Example was 10 seconds at 420°C., and 6 seconds at 440°C.

EXAMPLE 9

A bondable enamel was prepared by dissolving 100 parts by weight of a phenoxy resin (RKHH, trade name, the product of Union Carbide Corporation) in 400 g of m-cresol. The resulting bondable enamel was coated and baked on the insulated wire obtained in Example 2 to form a self-bondable layer having a thickness of 15 microns.

The resulting self-bonding magnet wire was formed into a helical coil with an inside diameter of 6 mm, and bonded at 170°C. for 20 minutes under a load of 600 g. The bond strength at room temperature of this wire, as measured in accordance with ASTM D 2519, was 20 Kg.

The solderabiltiy of the self-bonding magnet wire obtained in this Example was 12 seconds at 420°C and 7 seconds at 440°C.

Table 1

|  | Example 1 | Example 2 | Example 3 | Example 4 | Example 5 | Example 6 | Example 7 |
| --- | --- | --- | --- | --- | --- | --- | --- |
| Conductor Diameter(mm) | 1.002 | 1.001 | 0.998 | 1.000 | 1.002 | 1.001 | 0.999 |
| Film Thickness (mm) | 0.040 | 0.041 | 0.042 | 0.039 | 0.041 | 0.040 | 0.040 |
| Flexibility* | 1d | 1d | 1d | 1d | 1d | 1d | 1d |
| Abrasion Resistance (cycle)** | 124 | 116 | 102 | 96 | 98 | 87 | 81 |
| Cut Through Temperature(°C)*** | 293 | 282 | 285 | 274 | 280 | 273 | 278 |
| Breakdown Voltage (Kv) Normal Conditions | 12.9 | 13.5 | 12.7 | 12.3 | 13.6 | 12.5 | 12.4 |
| After Heating 240°C × 240hrs | 8.5 | 7.2 | 7.8 | 6.9 | 7.6 | 6.8 | 7.0 |
| Solderability(sec) Soldering Temp. 420°C | 10 | 10 | 10 | 8 | 12 | 9 | 8 |
| Soldering Temp. 440°C | 6 | 5 | 5 | 4 | 6 | 4 | 4 |
| Appearance of Insulated Wires | Good | Good | Good | Good | Good | Good | Good |

*Normal winding
**Repeated scrapeing (load 700g)
***4-Point Cross (load 5 kg)

|  | Comparative Example 1 | Comparative Example 2 | Comparative Example 3 | Comparative Example 4 | Comparative Example 5 | Comparative Example 6 | Comparative Example 7 |
| --- | --- | --- | --- | --- | --- | --- | --- |
| Conductor Diameter(mm) | 1.000 | 1.002 | 0.998 | 0.998 | 1.001 | 1.000 | 1.002 |
| Film Thickness(mm) | 0.041 | 0.041 | 0.041 | 0.042 | 0.040 | 0.041 | 0.038 |
| Flexibility* | 4d | 1d | 1d | 4d | 1d | 1d | 1d |
| Abrasion Resistance (cycle)** |  | 78 | 97 |  | 53 |  |  |
| Cut Through Temperature(°C)*** |  | 247 | 275 |  |  |  | more than 360 |
| Breakdown Voltage(Kv) Normal Conditions |  | 11.2 | 12.3 |  |  |  | 13.3 |
| After Heating 240°C × 240hrs |  | 1.1 | 7.1 |  |  |  | 12.5 |
| Solderability(sec) Soldering Temp. 420°C | 21 | 9 | more than 60 | 11 | Impossible | more than 60 | Impossible |
| Soldering Temp. 440°C | 12 | 4 | more than 60 | 4 | Impossible | more than 60 | Impossible |
| Appearance of Insulated Wires | Foamed | Good | Good | Foamed | Good | Good | Good |

While the invention has been described in detail and with reference to specific embodiments thereof, it will be apparent to one skilled in the art that various changes and modifications can be made therein without departing from the spirit and scope thereof.

What is claimed is:

1. A solderable thermostable insulated wire comprising a conductor having a wire enamel coated and baked thereon, said wire enamel comprising the reaction product of (A) a dicarboxylic acid free of a 5-membered imide ring and/or a derivative thereof, (B) a dicarboxylic acid containing a 5-membered imide ring and/or a derivative thereof, (C) a trihydric or higher aliphatic polyhydric alcohol, and (D) a dihydric alcohol, the equivalent proportions of the said components (A), (B) and (C) being 10 to 40 equivalent % for said component (A), 20 to 50 equivalent % for said component (B), and 40 to 55 equivalent % for said component (C).

2. The insulated wire of claim 1, wherein said dicarboxylic acid of component (A) is an aromatic, alicyclic or aliphatic dicarboxylic acid.

3. The insulated wire of claim 2, wherein said dicarboxylic is an aromatic dicarboxylic acid.

4. The insulated wire of claim 3, wherein said aromatic dicarboxylic acid is isophthalic acid, terephthalic acid, 1,2-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, diphenyl-2,2'-dicarboxylic acid, diphenyl-2,3'-dicarboxylic acid, diphenyl-2,4'-dicarboxylic acid, diphenyl, 3,3'-dicarboxylic acid, diphenyl-4,4'-dicarboxylic acid, diphenylmethane-2,2'-dicarboxylic acid, diphenylmethane-4,4'-dicarboxylic acid, diphenylethane-4,4'-dicarboxylic acid, diphenylsulfone-4,4'-dicarboxylic acid, benzophenone-4,4'-dicarboxylic acid, or diphenyl-2,2-propane-4,4'-dicarboxylic acid.

5. The insulated wire of claim 2, wherein said dicarboxylic acid of component (A) has the general formula

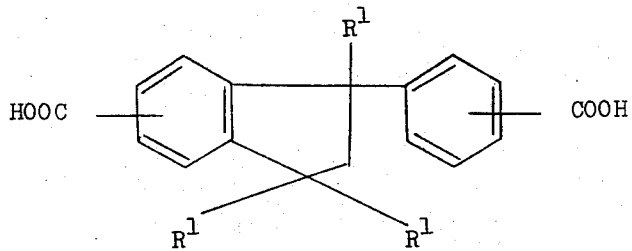

wherein $R^1$ is a hydrogen atom or an alkyl group containing 1 to 3 carbon atoms.

6. The insulated wire of claim 5, wherein said dicarboxylic acid is 3-(4-carboxyphenyl)-5-indanecarboxylic acid, 3-(3-carboxyphenyl)-5-indanecarboxylic acid, 3-(3-carboxyphenyl)-1, 1,3-triethyl-6-indanecarboxylic acid, 3-(4-carboxyphenyl)-1-methyl-1,3-dipropyl-5-indanecarboxylic acid or 3-(4-carboxyphenyl)-1-methyl-1,3-diethyl-6-indanecarboxylic acid.

7. The insulated wire of claim 2, wherein said aliphatic acid is adipic acid, succinic acid, maleic acid, sebacic acid, isosebacic acid, or dimeric acid.

8. The insulated wire of claim 2, wherein said alicyclic dicarboxylic acid has the general formula

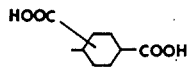

in which

is a cyclohexyl group or

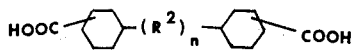

in which

is a cyclohexyl group, $R^2$ is —O—, —$CH_2$—, —($CH_2$)$_2$—, —C($CH_3$)$_2$—, —$SO_2$—, Si($CH_3$)$_2$, or

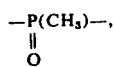

and n is a positive integer.

9. The insulated wire of claim 8, wherein said alicyclic dicarboxylic acid is hexahydroisophthalic acid, hexahydroterephthalic acid, or bicyclo[2,2,2]octane-1,4-dicarboxylic acid.

10. The insulated wire of claim 1, wherein said dicarboxylic acid of component (B) comprises the reaction product of an aromatic carboxylic anhydride containing a 5-membered ring carboxylic anhydride group and at least one other reactive group and a primary amine containing a primary amino group and at least one other reactive group or is the reaction product of an aromatic carboxylic anhydride containing a 5-membered ring carboxylic anhydride group and at least one other reactive group and a polyisocyanate compound.

11. The insulated wire of claim 10, wherein said aromatic carboxylic anhydride is a tricarboxylic acid anhydride or a tetracarboxylic dianhydride.

12. The insulated wire of claim 11, wherein said aromatic carboxylic anhydride is trimellitic anhydride, hemi-trimellitic anhydride, 1,2,5-naphthalenetricarboxylic anhydride, 2,3,6-naphthalenetricarboxylic anhydride, 1,8,4-naphthalenetricarboxylic anhydride, 3,4,4'-diphenyltricarboxylic anhydride, 3,4,4'-diphenylmethanetricarboxylic anhydride, 3,4,4'-diphenylether tricarboxylic anhydride, 3,4,4'-benzophenonetricarboxylic anhydride, pyromellitic dianhydride, 2,3,6,7-naphthalenetetracarboxylic dianhydride, 1,8,4,5-naphthalenetetracarboxylic dianhydride, 1,2,5,6-naphthalenetetracarboxylic cianhydride, 3,3',4,4'-diphenyltetracarboxylic dianhydride, 2,2', 3,3'-diphenyltetracarboxylic dianhydride, 3,3',4,4'-diphenylethertetracarboxylic dianhydride, 3,3',4,4'-diphenylmethanetetracarboxylic dianhydride, or 3,3',4,4'-benzophenonetetracarboxylic dianhydride.

13. The insulated wire of claim 10, wherein said compound containing said primary amino group is 4,4'-diaminodiphenyl methane, 4,4'-diaminodiphenyl ether, benzidine, 3,3'-diaminodiphenyl, 1,4-diaminonaphthalene, m-phenylene diamine, p-phenylene diamine, α,ω-nonamethylene diamine, 1,7-dimethylheptamethylene diamine, 4,4'-diaminodiphenyl ketone, bis-(4-aminophenyl)-α,α'-p-xylene, tolylene diamine, xylylene diamine, hexamethylene diamine, ethylene diamine, 4,4'-dicyclohexylmethane diamine, or diaminodiphenyl sulfone benzoguanamine.

14. The insulated wire of claim 10, wherein said polyisocyanate compound is m-phenylene diisocyanate, 2,4-tolylene diisocyanate, 2,6-tolylene diisocyanate, diphenyl ether-4,4'-diisocyanate, diphenylmethane-4,4'-diisocyanate, diphenylmethane-2,4'-diisocyanate, diphenylmethane-2,2'-diisocyanate, diphenylsulfone-4,4'-diisocyanate, diphenylthioether-4,4'-diisocyanate, naphthalenediisocyanate, polymethylenepolyphenylene polyisocyanate, hexamethylene diisocyanate, or xylylene diisocyanate; or a stabilized isocyanate obtained by stabilizing the isocyanate groups of these polyisocyanates with a phenolic hydroxyl group.

15. The insulated wire of claim 1, wherein said dicarboxylic acid of component (B) has the general formula

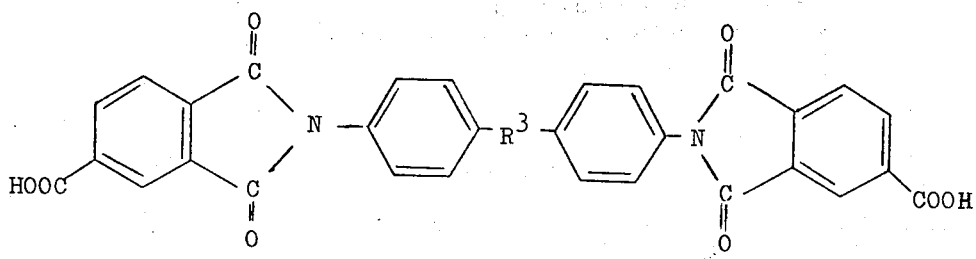

wherein R³ is —CH₂—, —O— or —SO₂—, or the general formula

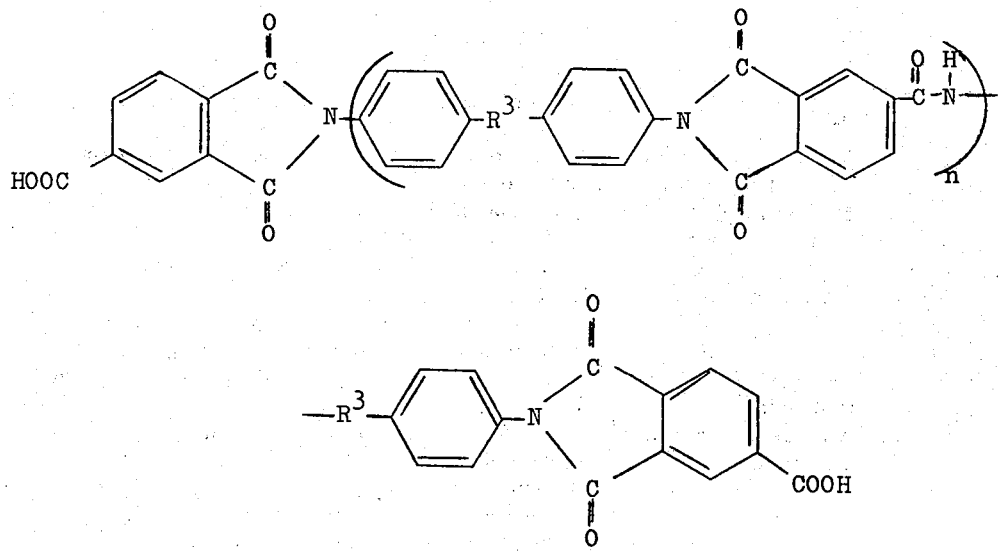

wherein R³ is —CH₂—, —O— or —SO₂—, and n is preferably above 0 but not more than 4 on the average.

16. The insulated wire of claim 1, wherein said aliphatic polyhydric alcohol is glycerol, pentaerythritol, 1,1,1-trimethylolethane, 1,1,1-trimethylol propane, sorbitol, mannitol, dipentaerythritol, diglycerol, or 1,2,6-hexanetriol.

17. The insulated wire of claim 1, wherein said dihydric alcohol of said component (D) is ethylene glycol, diethylene glycol, triethylene glycol, 1,2-propylene glycol, 1,3-propanediol, butanediol-1,3 or 1,1,pentanediol-1,5,hexanediol-1,6, butene-2-diol-1,4, 2,2-dimethyl-propanediol-1,3-2-ethyl-2-butylpropanediol-1,8, 1,4-dimethylolcyclohexane, butenediol-1,4, a hydrogenated bisphenol,2,2,4,4-tetramethyl-1,3-cyclobutanediol, hydroquinone-di-β-hydroxyethyl-ether, 1,4-cyclohexanedimethanol, 1,4-cyclohexane diethanol diethylene glycol, triethylene glycol, tetraethylene glycol, dipropylene glycol, trimethylene glycol, hexylene glycol, or octylene glycol.

18. The insulated wire of claim 1, including a polyamide insulation layer on said wire enamel coated layer.

19. The insulated wire of claim 18, wherein said polyamide is 6-nylon or 6,6-nylon.

20. A self-bonding magnet wire comprising the insulated wire of claim 1 having a self-bonding layer thereon.

21. The self-bonding magnetic wire of claim 20, wherein said self-bonding layer comprises a layer of polyvinyl butyral resin, phenoxy resin, polyamide resin, or a polysulfone resin.

* * * * *